Figures 1, 2:
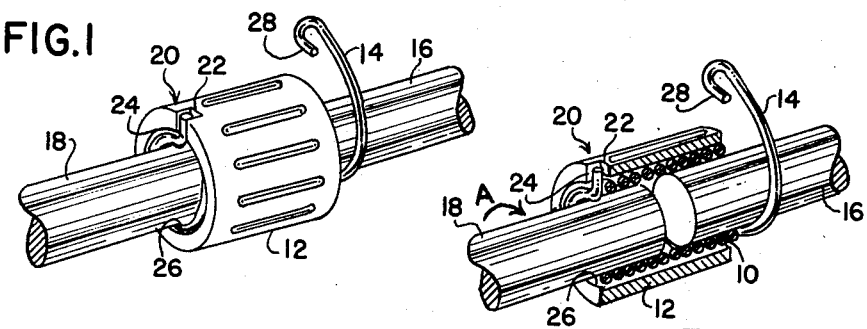

Oct. 6, 1959     W. FLIEG     2,907,189
DETACHABLE COUPLING
Filed Aug. 29, 1957     3 Sheets-Sheet 1

INVENTOR.
Werner Flieg
BY S.C. Yuter
ATTORNEY

INVENTOR.
Werner Flieg

BY S.C. Yutar

ATTORNEY

Oct. 6, 1959  W. FLIEG  2,907,189
DETACHABLE COUPLING
Filed Aug. 29, 1957  3 Sheets-Sheet 3

INVENTOR.
Werner Flieg
BY S.C. Yuter
ATTORNEY

United States Patent Office 2,907,189
Patented Oct. 6, 1959

2,907,189

DETACHABLE COUPLING

Werner Flieg, Brooklyn, N.Y.

Application August 29, 1957, Serial No. 681,114

13 Claims. (Cl. 64—15)

This invention relates to mechanical couplings and more particularly to readily detachable coupling units for the transmission of torque between driving and driven shafts. The invention also relates to methods of preparing elements for mechanical couplings.

In many instances in which rotary power is employed, it is a great convenience to be able to employ sources of power which are mechanically separated from the devices which are to be driven. For example, such mechanical separation enables a single power source to be employed to provide power for several independent loads used in series or parallel and, further, facilitates the removal of the loads for maintenance or replacement.

The use of separable power sources and loads creates a need for coupling devices and such devices must provide for efficient power transmission as well as of convenience of use. Thus, it is particularly useful to be able to readily detach the units which are coupled together.

Basically, a device which is to couple torque between a driving and a driven shaft consists of a connection to the driving shaft, a connection to a driven shaft and of means to relate the two connections so that a rotary motion imparted to one connection is transferred to the other connection. Further, for convenience of use, a coupling device should provide for the shafts being readily engaged and disengaged, the coupling device being completely detachable to facilitate its use with different loads and power sources, as well as for maintenance.

One known mechanism by which torque is transferred as outlined above employs pins accommodated in receptacles or radial bores in respective shafts. These pins constitute the connections to the driving and driven shafts and various known types of devices are used for rigidly coupling or relating the pins. This type of device is considered to be an efficient manner of transmitting rotary power but has, in fact, a serious limitation. For example, the thickness of a pin employed with a shaft of given diameter must be considerably smaller than the shaft diameter so that the shaft is not substantially weakened. The thickness of the pin, however, directly controls the maximum torque which can be transmitted inasmuch as this dimension directly influences the force at which the pin will shear. Consequently, the pin structure is an efficient transmitter of torque only within certain predetermined limits.

Another known mechanism by which torque is transmitted is a friction mechanism employing screws or similar members which are urged into frictional engagement with respective shafts and which are rigidly interconnected. The maximum torque which can be transmitted by such a mechanism is, however, limited by magnitude of the area of frictional contact and this, in turn, is limited by the diameters of the shafts. As a result, the screw structure is subjected to limitations in the same manner as is the pin structure.

In addition to the deficiencies noted above, the pin and screw type couplings are subject to further criticism. For example, pins and screws are apt to become loosened during use and must frequently be replaced, and removal and replacement of the pins generally requires special tools. Pins, moreover, must be accommodated in radial bores in their associated shafts and the provision of bores necessarily weakens these shafts. Screws, on the other hand, apply large forces to small areas on the surfaces of their associated shafts and therefore cause inordinate amounts of wear.

Accordingly, it is an object of the invention to provide an improved detachable coupling mechanism for the efficient transmission of torque from a driving to a driven shaft, which mechanism is substantially independent of the torque transmission limitations inherent in pin and screw type couplings.

Another object of the invention is to provide an improved coupling mechanism which can be attached and detached very rapidly and without the requirement of tools.

It is furthermore an object of the invention to provide an improved detachable coupling mechanism for the transmission of rotary power in which the problem of wear and thereby maintenance is minimized.

Another object of the invention is to provide an improved coupling for coupling two units together which permits either or both of the units to be readily detachable.

The objects of the invention also include the provision of a detachable torque coupling unit the parts of which are very easily manufactured and assembled, and are relatively inexpensive.

To achieve its various objects, the invention contemplates the utilization of a coupling member which is flexible in nature and, in some instances, resilient. In accordance with a preferred embodiment of the invention, the flexible device may consist of a helical or spiral spring the bore of which accommodates the shafts to be coupled. A support is employed to which the flexible device is connected for purposes of reference and a control device is provided in association with the flexible device to deform the same and facilitate the engagement and disengagement of the shafts.

An advantage of the invention is that the efficiency of the coupling improves in relation to the magnitudes of the forces to be transmitted. Moreover, the shaft engagement provided by the invention does not subject the coupled shafts to inordinate wear. Furthermore, the coupling forces are distributed in an entirely different manner than for pin and screw structures so that the limitations to which these structures are subject do not apply.

Advantageously, where a helical spring or like device is employed in accordance with the invention, the support contemplated by the invention is utilized to constitute a housing for the flexible device. Thus, not only does the support provide a reference point for the deformation of the flexible device by connection thereto, but it further provides the basis for a completely detachable and transportable unit as distinguished, for example, from clutch mechanisms which are fixed and which consequently do not provide for universal application as do devices provided by the invention.

It is to be noted, furthermore, that the use of a device which is both flexible and resilient as a coupling member advantageously permits the coupling of shafts other than rigidly. Thus, rapid accelerations and decelerations are not directly transmitted from one shaft to another so that sensitive instruments and tools coupled thereto will not be damaged.

Moreover, the resilient device can function to store energy. For example, where two shafts are coupled together by means of a helical spring and one shaft is rapidly accelerated or decelerated, the other shaft will continue to rotate as substantially the same velocity thereby winding the spring and converting kinetic energy into potential energy. This energy is thereafter imparted to the other shaft. This energy conversion can be a useful function in many applications such as, for example, in servo-mechanisms.

The utilization of a resilient device, furthermore, provides that the coupled shafts need not necessarily be held in coaxial alignment so that there can be a relative axial deviation between these shafts. This results in a self-compensation feature which enables a lateral movement of the driven object without effect on its source of power. Furthermore, undue strains on the coupling member are avoided.

It is an additional advantage of the invention that spiral springs can be provided such that the rotation of the driving shaft tightens or wraps the spring thereupon as well as upon the driven shaft so as to increase the efficiency of the device when in use.

Another advantage of the invention is that the use of a resilient spring device permits the driven member to coast to a stop, dissipating its kinetic energies by virtue of an overrun feature which is a characteristic of the invention.

Thus, the use of a resilient device prevents the driven member from being abruptly halted in an injurious manner when the driving member is halted. During the overrun period the rotation may be considered as a relative reversal of transmitted torque and it is also a characteristic of the invention that torque is only applied and transmitted in a unidirectional manner.

It is another advantage of the invention that the magnitude of overrun can be controlled by controlling the diametral interference of the resilient spring and the driven shaft. In terms of a system application, such as a servo system, this is desirable, since the magnitude of overrun controls the amount of time for stopping the driven shaft and inertia load.

As will be shown, a control is provided in acordance with the invention to facilitate engagement and disengagement of the shafts. It will be seen that the connection of the flexible device to the aforesaid support operates in combination with this control to enable both the driving and driven shafts to be accommodated simultaneously.

The invention, in accordance with another embodiment, further contemplates applications for couplings wherein the amount of stored energy during acceleration and deceleration is precisely controlled so that oscillatory motion is prevented. For such applications, the invention provides for rigidly spacing the flexible sections which are respectively coupled to the driving and driven shafts.

Advantageously, the spacing of the flexible sections in rigid fashion effectively isolates the sections and prevents an interchange of forces which might result in permanent deformations in the flexible element of the coupling, an additional feature of the invention.

In accordance with this embodiment of the invention, the helical spring mentioned above for use as a resilient device can be modfied or utilized in such a fashion as to present rigidly spaced sections. The methods of preparing springs with rigidly spaced sections constitute additional features of the invention.

Figure 3:
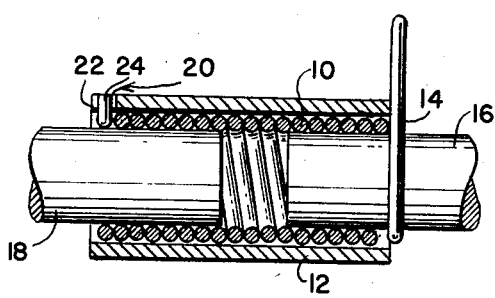
Figure 1A:
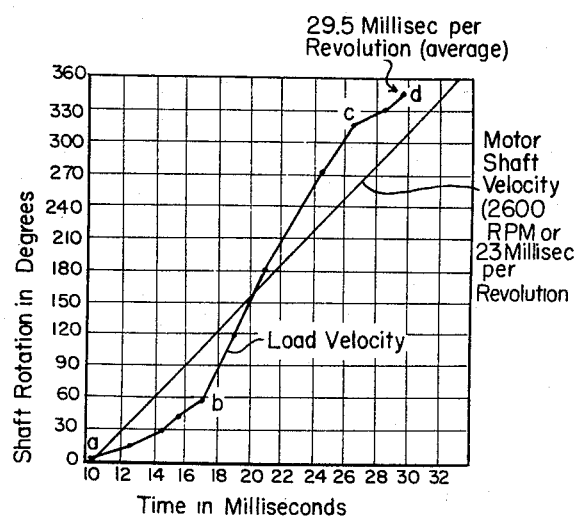

These methods and devices and other objects, features and advantages of the invention will next be set forth in the following detailed description as illustrated by the accompanying drawing in which:

Figure 1 is a perspective view of a detachable and portable coupling unit in accordance with an embodiment of the invention which employs a flexible and resilient device, Figure 1a is a graph illustrating how the coupling device of Fig. 1 functions to store energy during acceleration of the drive shaft, which energy is thereafter imparted to the driven shaft, Figure 2 is a perspective view, partially in section, of the unit of Fig. 1 shown engaging two shafts for the transmission of torque, Figure 3 is a side view, partially in section, of the coupling device shown in Fig. 1.

Figure 4:
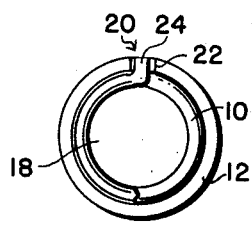
Figure 5:
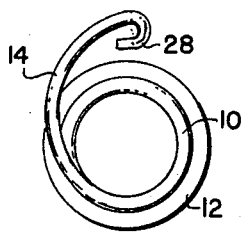
Figure 6:
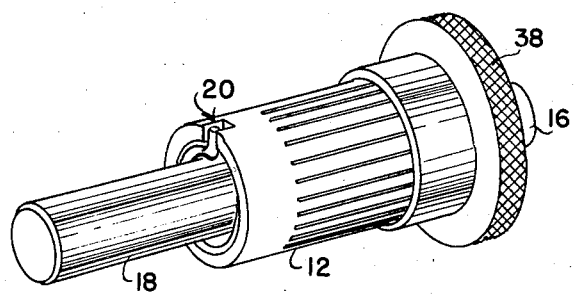

Figure 4 is an end view of the coupling device shown in Fig. 1, which end view illustrates the connection of the resilient device with the support, Figure 5 is a view of the other end of the coupling device illustrating the control device for facilitating engagement of the shafts by a deformation of the flexible and resilient device, Figure 6 is a perspective view of another embodiment of the invention employing a flexible and resilient device, the view particularly illustrating a collar for facilitating engagement and disengagement of the shafts.

Figure 7:
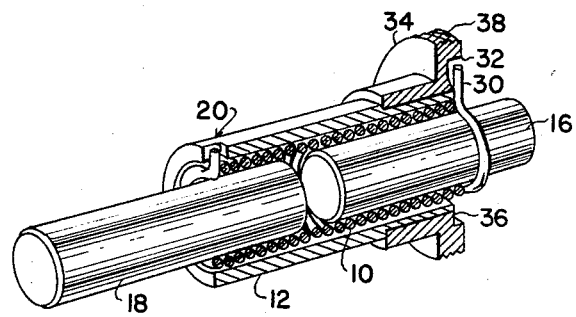

Figure 7 is a perspective view, partially in section, of the coupling shown in Fig. 6.

Figure 8:
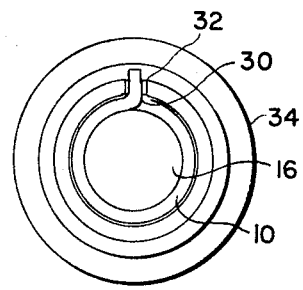
Figure 9:
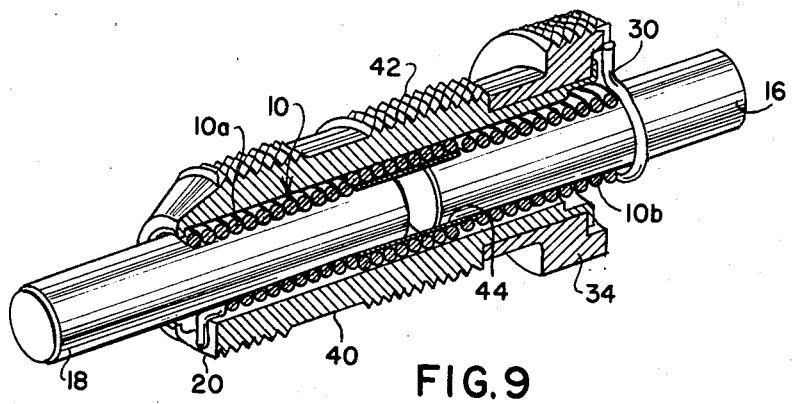
Figure 10:
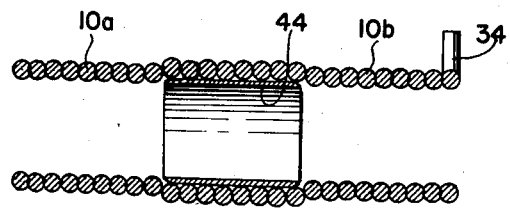
Figure 11A:
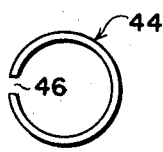
Figure 11B:
Figure 12:
Figure 12:
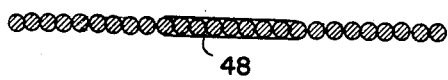

Figure 8 in an end view of the coupling device of Fig. 5 on which end is mounted the aforesaid collar, Figure 9 is a perspective view, partially in section, of a further embodiment of the invention illustrating the use of a flexible device with rigidly spaced sections, Figure 10 shows the flexible device of Fig. 9 and the mechanism for effecting spacing of the sections, Figures 11a and 11b illustrate the spacing mechanism of Fig. 10, and Figure 12 illustrates a further flexible mechanism with rigidly spaced sections, in accordance with still another embodiment of the invention.

In an aforegoing brief description of an embodiment of the invention, reference was made to a flexible device, a support, and to a control device for facilitating the engagement of shafts. In Figs. 1 and 2, the flexible device is constituted by a helical or spiral spring 10 which is also resilient, the support by a tublar sleeve 12, and the control device for facilitating engagement and disengagement of the shafts by the control 14. This structure essentially provides a coupling device for engaging two shafts 16 and 18 and which device further comprises a connection 20 between the spring 10 and the sleeve 12. The connection 20 is constituted by an open notch 22 in one end of the sleeve 12 and by a radially extending portion 24 of the spring 10.

The spring 10 is illustrated as being a helical spring which is generally cylindrical in outer configuration and which consists of a plurality of coils or turns of equal pitch. The spring 10 defines a cylindrical axial bore open at both ends to provide an axial accommodation for the shafts 16 and 18.

The spring 10 extends through the bore 26 of the sleeve 12 which bore is of predetermined diameter. The spring 10 has a normal condition of rest in which it is neither expanded nor contracted and, in this normal state, it has an outside diameter which is less than the diameter of the bore 26 and an inside diameter which is less than the diameters of the shafts 16 and 18.

The fact that the inner diameter of the spring 10 is less than the diameter of the shafts 16 and 18 means that, in the normal condition of the spring 10, it is capable of frictionally engaging the shafts 16 and 18. This initial engagement, however, need not be strong since the spring is wound so that the rotation of the driving shaft contracts the spring around both shafts.

Increasing the normal force acting between the spring 10 and the respective shafts 16 and 18 increases the frictional force as a linear function of the normal force, which in turn increases the torque transmitted as a linear function of the increasing frictional force. This is an accumulative process so that a logarithmic function is rapidly approached.

The fact that the diameter of the bore 26 exceeds the outer diameter of the spring 10 enables the spring 10 to expand and also to assume an axial deviation so that the shafts 16 and 18 need not be held in rigorous coaxial relationship. This means that the coupling device will automatically compensate for irregularities in the rotation of one or both shafts.

Specifically, the spring 10 provides for different types of deviation, each contributing to the benefit of the invention. For example, the spring 10 provides for a torsional deflection which enables the shafts to be rotated limitedly relative to one another. This provides for the storage of energy since the driven shaft can continue to rotate for a brief period following the stopping of the driving shaft; further, the spring 10 provides for the smooth coupling of torque during stopping and starting operations. Moreover, the spring 10 provides for an angular deviation whereby the axes of the shafts can be angularly disposed with respect to one another. This accommodates irregular dispositions of the load. Finally, the spring 10 will absorb certain magnitudes of thrust by virtue of an axial flexibility to prevent undesirable consequences of axial displacements of the shafts.

The spring 10 can be regarded as a double-ended flexible device (see Fig. 3) the ends of which may be considered as being defined by the control 14 and the connection 20. These ends, with the spring 10 in normal condition, are spaced by a distance which is less than the axial length of the sleeve 12. This arrangement has a two-fold purpose; firstly, it assures that the radial portion 24 is maintained in the notch 22 and, secondly, it serves to stretch the spring 10 so that it defines a perfectly cylindrical bore with a linear axis for the initial insertion of the shafts 16 and 18. The notch 22 may be closed by peening or spinning to prevent the radial portion 24 from leaving the notch 22.

The sleeve 12 is preferably a rigid member and thus, for example, is made of a metal, such as aluminum, or of a plastic. The sleeve 12 is also preferably tubular so as to constitute a housing adapted to the configuration of the spring 10. In fact, the sleeve 12 is the sole support for the spring 10 and provides, as noted above, the basis of a detachable and portable unit which is complete within itself and which is easily and conveniently handled. To facilitate engagement of the sleeve 12, it can be fluted as illustrated in Fig. 1 or provided with ribs, ridges or knurls.

The sleeve 12 provides a reference for the deformation or manipulation of the spring 10 by means of which the spring can be expanded to adjust its bore for accommodating the shafts 16 and 18. The reference comprises the aforenoted connection 20 and its notch 22 and radial portion 24 (see Fig. 4).

With the connection 20 being utilized as a reference, the invention contemplates the provision of a device connected to the spring at a position which is spaced from the connection 20. This device, which is constituted by the control 14, enables the deformation or manipulation of the spring 10 and an accompanying enlargement of its bore so as to facilitate accommodation of the shafts. The control 14, particularly, is engageable for expanding the spring 10 to increase its inner diameter whereby the shafts may be easily inserted.

The control 14 (Figs. 2 and 5) is an open turn at the end of the spring 10. Preferably, it extends from the spring 10 to a position which is outside of the circumference or periphery of the sleeve 12. In so extending, the control 14 facilitates engagement by the hand of an operator or by a tool. To further facilitate this operation, the control 14 is provided with a loop 28.

The detachable and portable unit, the elements of which have been described above, presents a bore defined by the spring 10 with which the shafts have diametral interference. Upon a manipulation of the control 14, however, the spring 10 expands and the shafts 16 and 18 can be readily inserted either one at a time or simultaneously. To cause the spring 10 to expand, the control 14 is moved in a direction so as to urge the turns of the spring in an unwinding direction. This operation is conducted while the sleeve 12 is held so as to prevent its rotation and thus the rotation of the connection 20.

With the shafts 16 and 18 positioned in either abutting or axial spaced relationship, the control 14 is released to assume its normal position relative to the spring which position will be assumed under the influence of the tension which has been created by the partial unwinding of the spring. When the control 14 is released, the spring 10 returns as far as possible to its normal condition and the shafts 16 and 18 are firmly engaged.

The engagement of the shafts by the spring 10 is dissimilar to the types of engagement which result in the pin and screw type structures noted above. Firstly, there are no pins to shear and the strength of the spring 10 as a coupling element is dependent on its own tensile strength. Tensile strengths are normally much greater than shear strengths for given dimensions of materials which may be employed for the described type of structure. Secondly, the spring 10 engages shafts 16 and 18 along substantially the entire spring length so that the frictional engagement is not concentrated into one small area as is the case with screw structures. Moreover, upon rotation of the driving shaft (in the direction of arrow A in Fig. 2), the spring 10 will tend to be wound more tightly about both of the engaged shafts and the coupling will, consequently, become more efficient. This advantage is not inherent in any of the known types of detachable and transportable couplings in which both shafts are disengageable.

The spring 10 provides for storage of transient energy if an inertia load is accelerated suddenly. The energy of the acceleration forces, which tends to stall the prime mover, is stored temporarily and then imparted to the inertia load resulting in additional acceleration.

A typical example is illustrated by the graph shown in Fig. 1a. Two curves are indicated, the motor or drive shaft velocity which is constant, and the instantaneous velocities of an inertia load which has been accelerated suddenly.

From $a$ to $b$, triansient energies due to acceleration forces are stored in the coupling device which is indicated by a differential slope of relatively lower instantaneous velocities. From $b$ to $c$, the stored energy is given up to the load in the form of additional acceleration, whereby the differential slope of the load overtakes the slope of the motor shaft resulting in relatively higher instantaneous velocities. From $c$ to $d$ both slopes are the same indicating synchronous speed.

If a coupling device other than the invention is used, the transient energies due to acceleration and deceleration forces would normally result in shock loads and consequent damaging of the system.

It should be noted that due to conversion of the transient energies to useful work, such as additional acceleration, the system completes its duty cycle in terms of rotation and time slightly ahead of the motor shaft.

The specific structure which has been described can be modified while still accomplishing the functions which have been ascribed to it. The bore may have different diameters at its opposite ends so as to accommodate shafts of different sizes. Further, the sleeve 12 need not be a right cylinder and instead might be arcuate or angled since the spring 10 can transmit torque in other than linear directions.

A further illustrative embodiment of the invention is shown in Figs. 6–8 in which a modification of the above described control 14 is employed. In Figs. 6–8, elements equivalent to those used in the first described embodiment are indicated by the use of like reference numerals.

The coupling device shown in perspective in Figs. 6 and 7 also includes a spring 10 housed in a sleeve or support 12 for engaging shafts 16 and 18. A connection 20 is employed to couple the spring 10 to the sleeve 12.

In this embodiment, however, the open turn at the end of the spring 10 consists of a linear, rather than an arcuate, radially extending portion 30 which is received in a notch 32 (see Figs. 7 and 8) of a collar 34.

The collar 34 is rotatably supported on the sleeve 12 and is prevented from slipping off the end of the sleeve by a peripheral lip 36 which is formed on the end of the sleeve. The collar 34 can be knurled as at 38 to facilitate engagement by hand or tool.

In general principle, the second coupling unit is used in the same manner as the first-described unit. The shafts 16 and 18 are engaged by the spring 10 after having been inserted with the spring 10 expanded to facilitate the inserting operation. However, the added collar 34 affords a greater mechanical advantage and a greater convenience for expanding the spring 10 to accommodate the shafts 16 and 18. The collar 34 and its associated improvements furthermore achieve their additional advantages without in any manner detracting from the compact character of the coupling unit. The use of the collar 34, moreover, substantially completes the shielding of the spring 10 and the elements integral therewith.

It should be noted that the embodiments of the invention shown in Figures 1–5 and Figures 6–8 are particularly useful for start-stop application because the turns of the spring 10 which are adjacent to the gap between the shafts 16 and 18 function to prevent shock. However, in continuous rather than start-stop applications this feature is not required and, in accordance with another embodiment of the invention, a mechanical coupling of the type shown in Figures 9–11 and Figure 12 may be employed.

The mechanical coupling shown in Figures 9–11 includes a flexible member which consists of rigidly spaced flexible parts. A housing or casing 40 serving as a tubular sleeve and having knurled sections 42 supports a spring 10 in which are engaged shafts 16 and 18. The connection 29 provides a reference by virtue of which the radially extending portion 30 is effective to expand the spring 10 to facilitate insertion of the shafts.

The spring 10 is, however, effectively divided into spaced parts 10a and 10b by means of a sleeve or bushing 44 the functions of which include preventing an entrapment of turns of the spring 10 intermediate the adjacent ends of the shafts.

As is shown particularly in Figure 10, the bushing 44 is preferably centered with regard to the axis of the spring 10. Furthermore, the outer diameter of the bushing 44 is preferably a few thousandths of an inch greater than the inner diameter of the spring 10 so that the bushing is locked into position. Moreover, the inner diameter of the bushing 44 is large enough to accommodate the shafts 16 and 18.

As is shown in Figures 11a and 11b, the bushing 44 can be of split-ring type with an axial slot 46 and of a material such as beryllium copper. This construction facilitates the insertion of the bushing into the spring 10 by reason of the resiliency of the bushing in the sense that it can be compressed to have a temporarily smaller diameter.

The resilient character of the bushing 44 is, however, limited to the function of facilitating insertion into a spring. In other respects, its function is to provide for rigidly spacing the section 10a and 10b of the spring 10.

By the provision of the rigidly spaced sections, various of the resilient deflections noted above are avoided; however, the flexibility enabling the engagement of the shafts is still present. Moreover, it will be observed that by the use of the bushing 44 it is impossible to trap turns of the spring 10 between the shafts so as to cause their permanent deformaiton. This type of coupling further eliminates torsional deflection at the center section of the spring 10 so as to avoid lags between the driving and driven shafts. Advantageously, the structure also eliminates the possibility of overloading the free turns intermediate spaced shafts and thereby prevents a permanent distortion of these turns. Additionally, the load characteristics of this type of coupling are independent of the spacing of the shafts. Still further, oscillations during starting and stopping operations are prevented by the use of this structure in applications where such oscillations are not desired.

One method of providing spaced flexible sections has been indicated above relative to the insertion of the split-ring type of bushing into the spring. It is, however, also contemplated in accordance with the invention that the bushing be wound directly into the spring. In accordance with this latter method, a spring is wound on a mandrel or similar mechanism such as an arbor. When part of the spring is wound, the bushing is placed over the mandrel and the winding continued along the bushing and thence again on the mandrel. The completed unit can then simply be slipped from the mandrel.

Still another method is indicated in Figure 12. In this structure, the turns at the center of the spring 10 are covered with solder to form a rigid central portion dividing the spring into sections 10a and 10b. In this method, known induction soldering techniques are employed to avoid the annealing of the spring.

The detachable and portable units which have been described constitute in every sense efficient mechanical couplings free from the deficiencies inherent in known detachable couplings and having a universality of application not to be found in clutch mechanisms or the like. They are convenient to use and economical to manufacture. Furthermore, they involve no special dimensions or considerations.

There will now be obvious to those skilled in the art many modifications and variations which do not depart essentially from the spirit of the invention as defined in the following claims.

What is claimed is:

1. A mechanical coupling for transmitting torque between shafts comprising a double ended flexible device defining a bore wherein said shafts are frictionally engaged, said device being responsive to a relative rotational displacement of its ends for expanding the bore to facilitate engagement of said shafts, a support coupled to one of the ends of said device and adapted for being maintained in fixed position, and means connected to the other end of said device and engageable for providing said relative rotational displacement.

2. A coupling as claimed in claim 1, wherein said flexible device is a resilient spiral spring and said support is a tubular sleeve of determinable circumference, said means extending from the spring to a position outside of said circumference for ready engagement.

3. A coupling as claimed in claim 2 comprising means dividing said spring into rigidly spaced sections.

4. A coupling as claimed in claim 2 comprising a collar rotatably mounted on said sleeve and defining a notch for engaging said means extending from the spring.

5. A mechanical coupling unit for coupling first and second shafts comprising a sleeve defining a cylindrical bore, a helical spring extending axially through said bore and adapted for frictionally engaging said shafts, a connection between one end of said spring and one end of said sleeve, and means on the other end of said spring to expand the spring for the insertion of the shafts, the shafts being respectively engaged by the end portions of said spring in spaced relationshisp with said means being held by said spring in abutting relationship with said sleeve, the portion of the spring intermediate the shafts resiliently accommodating rotational displacements of said shafts.

6. A torque coupling device comprising a rotated shaft, a rotatable shaft, a detachable helical spring frictionally engaging both of said shafts for rotating said rotatable shaft, and a sleeve housing said spring and coupled to one end thereof, the other end of said spring being freely displaceable for expanding the spring to facilitate the insertion and removal of said shafts, said shafts, spring and sleeve being rotatable together.

7. A detachable coupling unit adapted for coupling first and second shafts comprising a support, a helical spring adapted for being coupled to said support and defining axial accommodations within which said shafts are frictionally engaged, a connection for coupling said spring to said support, and means coupled to said spring at a position spaced from said connection for the manipulation of said spring intermediate the connection and said means, the manipulation of the spring facilitating the accommodation of said shafts by the adjustment of said accommodations to avoid temporarily the frictional engagement of said shafts.

8. A unit as claimed in claim 7 adapted for coupling shafts of determinable diameters, said spring having normal inner and outer diameters, the normal inner diameter being smaller than the diameters of said shafts, the support being a tubular member defining a bore of larger diameter than said normal outer diameter to provide for increases in said outer diameter, said means being engageable for urging the unwinding of said helical spring whereby said inner diameter is increased to accommodate said shafts.

9. A unit as claimed in claim 7 wherein said means is fixedly connected to said spring, said support defining a minimum spacing between said connection and said means to stretch the spring therebetween so that said spring rigorously defines a cylindrical bore to accommodate said shafts.

10. A unit as claimed in claim 7 comprising means for dividing said spring into rigidly spaced sections.

11. A detachable coupling unit for coupling driving and driven shafts comprising a rigid tubular sleeve, a helical spring loosely accommodated in said sleeve, said spring being coupled to said sleeve for restricting the movement of said spring in said sleeve, said spring defining a bore for frictionally engaging said shafts, and control means on said spring in a position spaced from the coupling of said spring to said sleeve, said means being engageable for expanding said spring and thereby facilitating the insertion of said shafts into the bore.

12. A unit as claimed in claim 11 wherein an end of said spring is coupled to an end of said sleeve, said sleeve, at its end, defining an open notch; said spring, at its end, comprising a radially directed portion engaging in said notch.

13. A unit as claimed in claim 12 wherein the control means extends in a radial direction from said spring, the length of said sleeve intermediate said radially directed portion and said control means exceeding the normal length of the spring therebetween whereby said radially extending portion is held fast in said notch.

References Cited in the file of this patent

UNITED STATES PATENTS

| | | |
|---|---|---|
| 1,286,527 | Burton et al. | Dec. 3, 1918 |
| 1,312,296 | Apple | Aug. 5, 1919 |
| 1,485,036 | Kingsley | Feb. 26, 1924 |

FOREIGN PATENTS

| | | |
|---|---|---|
| 329,404 | Great Britain | May 22, 1930 |